(12) United States Patent
Perry

(10) Patent No.: US 7,298,835 B1
(45) Date of Patent: Nov. 20, 2007

(54) SYSTEMS AND METHODS FOR IMPLEMENTING A PARENTAL CONTROL FEATURE WITHIN A TELECOMMUNICATIONS NETWORK

(75) Inventor: Nathan E. Perry, Pensacola, FL (US)

(73) Assignee: AT&T BLS Intellectual Property, Inc., Wilmington, DE (US)

(*) Notice: Subject to any disclaimer, the term of this patent is extended or adjusted under 35 U.S.C. 154(b) by 607 days.

(21) Appl. No.: 09/891,638

(22) Filed: Jun. 26, 2001

(51) Int. Cl.
*H04M 3/42* (2006.01)
*H04M 1/66* (2006.01)

(52) U.S. Cl. ............. 379/210.02; 379/200; 379/201.01

(58) Field of Classification Search .......... 379/210.02, 379/211.03, 221.02, 114.01, 188, 196, 372, 379/200, 88.19, 88, 201.01; 370/354, 352; 455/565; 704/231, 236
See application file for complete search history.

(56) References Cited

U.S. PATENT DOCUMENTS

| | | | | |
|---|---|---|---|---|
| 5,200,995 A | * | 4/1993 | Gaukel et al. ............. | 379/200 |
| 5,329,578 A | * | 7/1994 | Brennan et al. ....... | 379/211.03 |
| 5,430,719 A | | 7/1995 | Weisser, Jr. ................ | 370/58.2 |
| 5,535,261 A | * | 7/1996 | Brown et al. ............ | 379/88.11 |
| 5,563,939 A | * | 10/1996 | La Porta et al. ........ | 379/221.02 |
| 5,802,157 A | * | 9/1998 | Clarke et al. ................ | 379/196 |
| 5,917,893 A | * | 6/1999 | Katz ........................ | 379/93.02 |
| 6,014,435 A | * | 1/2000 | Rosen ....................... | 379/200 |
| 6,055,302 A | * | 4/2000 | Schmersel et al. ..... | 379/201.01 |
| 6,085,080 A | * | 7/2000 | Rahikainen et al. ......... | 455/403 |
| 6,134,310 A | * | 10/2000 | Swan et al. ................. | 379/188 |
| 6,134,320 A | * | 10/2000 | Swan et al. ................. | 379/372 |
| 6,256,515 B1 | * | 7/2001 | Cox et al. .................... | 455/565 |
| 6,263,071 B1 | * | 7/2001 | Swan et al. ................. | 379/372 |
| 6,311,055 B1 | * | 10/2001 | Boltz ..................... | 455/414.1 |
| 6,456,706 B1 | * | 9/2002 | Blood et al. ................. | 379/188 |
| 6,490,345 B2 | * | 12/2002 | Fleischer et al. ...... | 379/114.01 |
| 6,798,772 B2 | * | 9/2004 | Bergman et al. ............ | 370/354 |
| 6,804,335 B1 | * | 10/2004 | Kugell .................... | 379/88.19 |
| 6,871,082 B2 | * | 3/2005 | Cox et al. .................... | 455/565 |
| 2005/0232249 A1 | * | 10/2005 | Mishra ........................ | 370/352 |

* cited by examiner

*Primary Examiner*—Thjuan K. Addy
(74) *Attorney, Agent, or Firm*—Lee & Hayes, PLLC

(57) ABSTRACT

A "parental control" ("PC") telephone subscriber feature on a telephone system is disclosed. An authorized subscriber, such as a parent, may enter a feature code which initiates the PC feature. To deactivate the feature, the subscriber enters the code and is prompted for an authorization code, such as a personal identification number ("PIN"). If the authorization code entered matches the authorization code on file for the subscriber, the PC feature is deactivated. If no match is found in the subscriber database for the PIN, the feature is not deactivated.

13 Claims, 3 Drawing Sheets

US 7,298,835 B1

SYSTEMS AND METHODS FOR IMPLEMENTING A PARENTAL CONTROL FEATURE WITHIN A TELECOMMUNICATIONS NETWORK

FIELD OF THE INVENTION

The present invention relates in general to a subscriber feature within a telecommunications network. More particularly, the present invention relates to a "parental control" subscriber feature that can be turned on and off by authorized callers (such as parents) to block unauthorized callers (such as children) from making telephone calls to certain telephone numbers or categories of telephone numbers.

BACKGROUND OF THE INVENTION

In recent years, a number of new telephone service features have been provided by an Advanced Intelligent Network (AIN). The AIN evolved out of a need to increase the capabilities of the telephone network in order to meet the growing needs of telephone customers or users. The AIN architecture generally comprises two networks, a data messaging network and circuit-switched, trunked communications network. The trunked communications network handles voice and data communications between dispersed network locations, whereas the data messaging network is provided for controlling operations of the trunked communications network.

A call blocking feature currently is available so that a subscriber can block telephone calls of a particular category (such as from a caller who blocks the display of the caller's telephone number on a Caller ID display unit). The capability also exists to block telephone calls from a particular calling line. However, some subscribers have problems with callers (such as the subscriber's child or children or other individuals having access to the subscriber's telephone station) making unauthorized out-going telephone calls. For example, a child could make a long-distance phone call to talk to his or her pen pal in Peru, incurring large telephone bills that Mom and Dad have to pay. Likewise, parents may wish to prevent children or other callers from placing calls to 900 lines or the like. It would be advantageous if a parent or authorized caller could specify a list or category of telephone numbers that a child or other unauthorized caller is permitted to call or is prohibited from calling.

SUMMARY OF THE INVENTION

The present invention is directed to a "parental control" ("PC") telephone subscriber feature on a telephone system. An authorized subscriber, such as a parent, may enter a feature code (such as *22, for example), which initiates the PC feature. Optionally, the subscriber is prompted for the authorization code to activate as well as to deactivate the feature. To deactivate the feature, the subscriber enters the code (e.g. *22) again. Alternately, one feature code (e.g. *22) activates the feature and another feature code (e.g. *23) deactivates the feature. When the subscriber has signed up for the feature and the feature is activated, the caller is prompted for an authorization code, such as a personal identification number ("PIN"). If the authorization code entered matches the authorization code on file for the subscriber, the PC feature is deactivated. If no match is found in the subscriber database for the PIN, the feature is not deactivated.

According to aspects of the invention, an authorized subscriber may be able to specify any one or a combination of the following:
1. Prohibit all out-going telephone calls.
2. Prohibit all out-going long-distance telephone calls.
3. Prohibit out-going calls to specified area codes.
4. Prohibit out-going calls to specified telephone numbers.
5. Prohibit special feature calls (* code calls).
6. Allow out-going calls only to local telephone numbers.
7. Allow out-going calls only to specified telephone numbers.

Regardless of the telephone numbers entered or not entered by the authorized subscriber with respect to the above options, preferably emergency calls such as calls to 911 are always enabled.

According to another aspect of the invention, the feature may be automatically activated or deactivated at pre-set times. According to another aspect of the invention, the feature can be over-ridden (for a single out-going call only) by entering an over-ride code.

The foregoing and other aspects of the present invention will become apparent from the following detailed description of the invention when considered in conjunction with the accompanying drawings.

BRIEF DESCRIPTION OF DRAWINGS

The foregoing summary, as well as the following detailed description of preferred embodiments of the present invention, will be better understood when read in conjunction with the appended drawings. For the purpose of illustrating the invention, there are shown in the drawings embodiments that are presently preferred. As should be understood, however, the invention is not limited to the precise arrangements and instrumentalities shown. In the drawings.

DETAILED DESCRIPTION OF THE PREFERRED EMBODIMENT

Advanced Intelligent Network (AIN) System

Referring now to the figures, a preferred embodiment of the systems and methods of the invention will be described. Basic telephony concepts and terminology are used throughout the description as would be understood by one of skill in the art.

Figure 1:
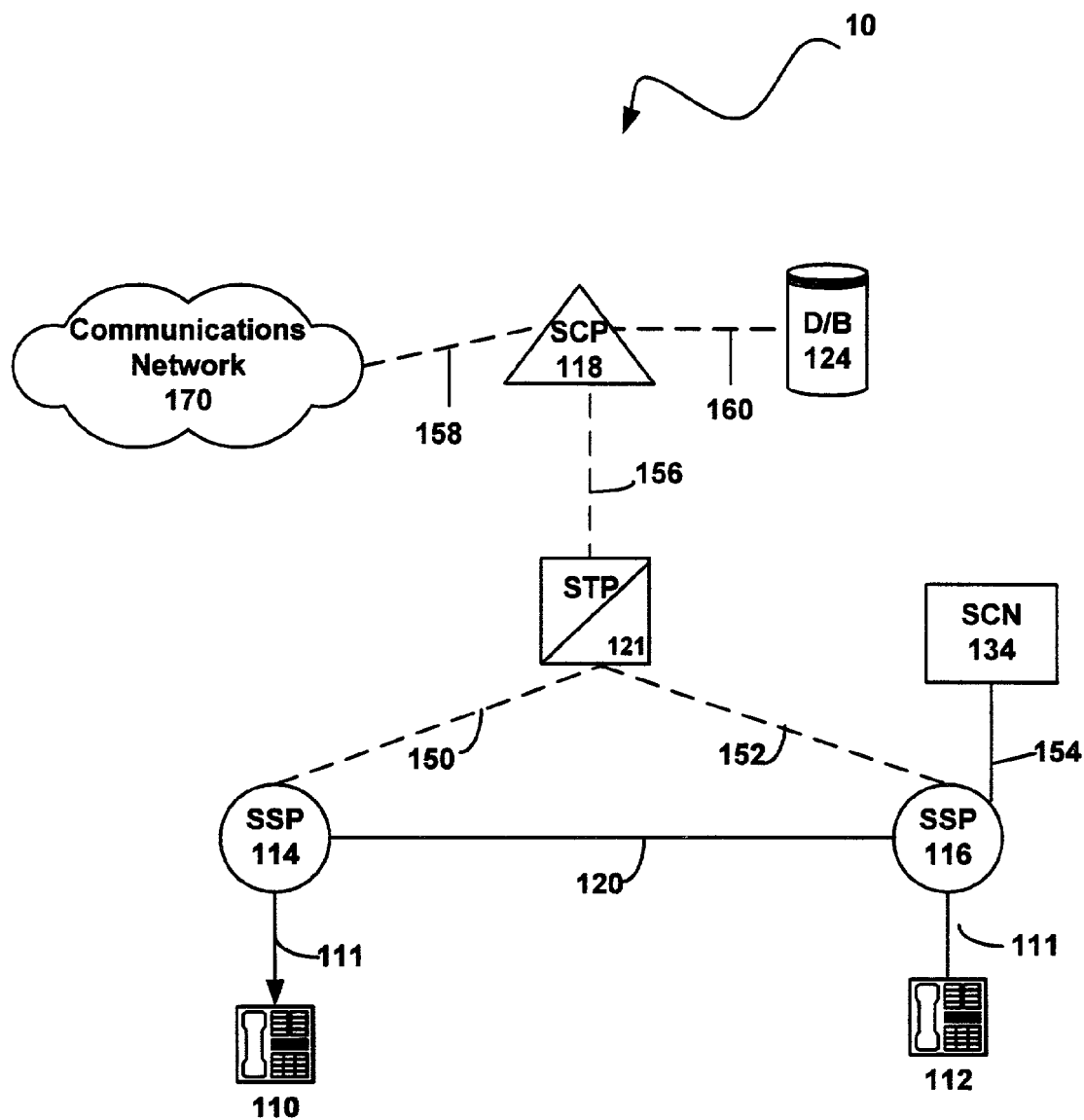
FIG. 1 shows a simplified schematic diagram of a telecommunications network including local telephone handsets and their associated service switching point, a service control point and a services circuit node in accordance with an embodiment of the present invention.

Reference is now made to FIG. 1 illustrating an exemplary telecommunication network 10 that connects a call between a first telephone station 110 and a second telephone station 112 in accordance with the invention. This exemplary environment is a public switched telecommunication network (PSTN). A portion of the PSTN is illustrated in FIG. 1 and is described generally below.

In particular, the detailed portion of the PSTN illustrates a part of the advanced intelligent network (AIN) of a typical local exchange carrier. For brevity, only a basic explanation of the PSTN is provided herein. Where the PSTN operates or is composed differently in an important aspect from that which would be understood by those skilled in the art, additional details are provided herein. For further information regarding the referenced PSTN and AIN aspects thereof, the interested reader is referred to the Weisser patent, U.S. Pat. No. 5,430,719, which is incorporated herein by reference. In particular, an AIN network with advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

FIG. 1 illustrates a simplified AIN-based network arrangement incorporating the various features of the invention, as further described below. The AIN includes a variety of interconnected network elements. A group of such network elements includes a plurality of central offices (COs) or service switching points (SSPs) 114, 116. A CO or SSP is basically a switch and the terms are used interchangeably herein. SSPs 114, 116 may comprise, for example DMS100 or SESS switches. These switches may be manufactured by, for example, Lucent Technologies, Inc. or Nortel Networks. As further illustrated in FIG. 1, SSPs 114, 116 have a plurality of subscriber lines 111 connected thereto. Each SSP 114, 116 serves a designated group of subscriber lines, and thus, the SSP or switch that serves a particular subscriber line may be referred to as its serving switch. A subscriber line may also be referred to as a calling line.

Each subscriber line is connected typically to a piece of terminating equipment including a plurality of telephones designated, e.g., as 110, 112. Although telephones are illustrated as the pieces of terminating equipment in FIG. 1, those skilled in the art will understand that such pieces include other telecommunication devices such as but not limited to facsimile machines, computers, modems, and the like.

Each active calling line in an AIN is assigned a ten-digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 1, SSPs 114, 116 are interconnected by a plurality of trunk circuits 120. These are the voice path trunks that interconnect the SSPs to connect communications. The term "communication" or "call" is used herein to include all messages that may be exchanged between caller and called party in the network illustrated in FIG. 1. Trunk circuit 120 may be either a Signaling System 7 (SS7) controlled multi-frequency trunk (MF) or primary rate interface (PRI) trunk. The type of trunk will be in accordance with both the sending and receiving SSP to which it is connected.

In the example shown in FIG. 1, each SSP 114, 116 may include different types of facilities and/or triggers. SSPs 114, 116 are programmable switches which may perform any or all of the following functions: recognize AIN-type calls, launch queries to SCP 118 (described below), and receive commands and data from SCP 118 to further process and route AIN-type calls. When one of SSPs 114, 116 is triggered by an AIN-type call, the triggered SSP 114, 116 formulates and sends an AIN query. Based on the reply from the AIN type call, SSP 114, 116 responds to call processing instructions from the network element in which the AIN service logic resides. According to an aspect of the invention, the AIN service logic may reside at SCP 118.

Each of the SSPs 114, 116 is connected to a signal transfer point (STP) 121 via respective data links 150, 152. In one embodiment, these data links employ a signaling protocol referred to as Signaling System 7 (SS7), which is well known to those skilled in the art, although it should be understood that the use of other suitable signaling protocols are contemplated by the invention:

In order to facilitate signaling and data messaging, each SSP 114, 116 may be equipped with Common Channel Signaling (CCS) capabilities, e.g., SS7, which provides two-way communications of data messages over CCS links 150 and 152 between components of the AIN network. The data messages may be formatted in accordance with the Transaction Capabilities Applications Part (TCAP). Alternatively, Integrated Service Digital Network, (ISDN) Users Part (ISUP) may be used for signaling purposes between, for example, SSPs 114 and 116. In such a case, SSPs 114 and 116 may be equipped with the capability to map appropriate data between TCAP and ISUP protocols, and vice versa. The telephone network essentially employs an upper-level software controlled network through STPs 121 and SCPs 118.

AIN SSPs 114 and 116 may allow normal switch processing to be suspended at specific points in a call so that the switch may send an AIN message query via signaling transfer point (STP) 121 to SCP 118. SCP 118 may execute software based service logic and return call-processing instructions to the triggering AIN SSP. New services may be provisioned by assigning AIN SSP triggers to customer lines, trunks, and/or North American Numbering Plan (NANP) telephone numbers.

Much of the intelligence of the AIN resides in a service control point (SCP) 118 that is connected to STP 121 over an SS7 or other suitable data link 156. Among the functions performed by SCP 118 is the hosting of network databases and subscriber databases that may be stored in database storage object 124. Database storage object 124 is shown as a database communicatively coupled to SCP 118, although data storage object 124 may be embodied as a component within SCP 118, such as an internally-mounted hard disk device. The data bases stored in data storage object 124 may be used in providing telecommunications services to a customer. Typically, SCP 118 is also the repository of service package applications (SPAs) (not shown) that are used in the application of telecommunications services, enhanced features, or subscriber services to subscriber lines. Additionally, SPAs may use databases for providing telecommunication services.

A set of triggers may be defined at SSPs 114, 116. A trigger in the AIN is an event associated with a particular call that initiates a query to be sent to SCP 118. The trigger may cause SCP 118 to access processing instructions with respect to the particular call. The results of processing that occurs at SCP 118 (that may include database inquiries) are sent back to SSP 114, 116 through STP 121. The return packet may include instructions to SSP 114, 116 as to how to process the call. The instructions may be to take some special action as a result of a customized calling service, enhanced feature or subscriber service. In response, SSP 114, 116 may move through its call states, and generate further packets that are used to set up and route calls. Similar devices for routing calls among various local exchange carriers are provided by regional STP and regional SCP (not shown).

An example of such a trigger is a Custom Dialing Plan (CDP) or Feature Code (FC) trigger. Another example includes a termination attempt trigger (TAT), which causes a query to be sent to SCP 118 whenever an attempt is made to terminate a call. Another type of trigger that may be used is a Public Office Dialing Plan (PODP) trigger although other suitable triggers may be used.

AIN SSPs 114 and 116 may allow normal switch processing to be suspended at specific points in a call so that the switch may send an AIN message query via signaling transfer point (STP) 121 to SCP 118 as described above. SCP 118 may execute software based service logic and return call-processing instructions to the triggering AIN SSP. New services may be provisioned by assigning AIN SSP triggers to customer lines, trunks, and/or NANP (North American Numbering Plan) telephone numbers.

The system of FIG. 1 may also include a services circuit node (SCN) 134, which may also be referred to herein as services node (SN) 134. SCN 134 is a programmable interactive data system that can act as a switch to transfer calls. SCN 134 may provide interactive help, collect voice information from participants in a call, provide notification functions and/or store subscriber data. SCN 134 may be a Lucent Technologies Star Server FT Model 3200 or Model 3300 although other units may be employed without departing from the scope of the invention. SCN 134 may include voice and dual tone multi-frequency (DTMF) signal recognition devices and voice synthesis devices. In addition, SCN 134 may include a data assembly interface. In addition SCN 134 may request SCP 118 to retrieve information from database storage object 124, contain information concerning calling party i 10, may receive information from SCP 118, may make outgoing calls to subscriber station 112, may convert alphanumerical textual data to speech, may announce converted information retrieved from SCP 118 to subscriber station 112 and/or may connect telephone station 110 to subscriber station 112. Communications link 154 between SSP 116 and SCN 134 may be a PRI or basic rate interface (BRI) line or any other suitable telephone line. PRI and BRI lines are circuit-switched ISDN lines. SCN 134 and network 170 may be communicatively coupled via a data link (not shown) using an X25, TCP/IP or SS7 protocol or any other suitable protocol. In addition, SCN 134 typically is connected to one or more (but usually only a few) SSPs 114, 116 via Integrated Service Digital Network (ISDN) links 154. Accordingly, connections by links 150, 152, 156 and 158 are for signaling purposes and allow SSPs 114 and 116 to send and receive messages to and from SCP 118 and SCN 134.

For purposes of illustration, various features of the present invention will now be described from the standpoint of a switch implementing AIN protocols, provisioned with CDP or FC triggers. However, as will be apparent to those of ordinary skill in the art based on the disclosure provided herein, the present invention is not limited to implementation through these particular triggers and protocols and may be designed and provisioned with a network utilizing other triggers and protocols. For example, SSP 114 and/or 116 may represent a TCP/IP telecommunications switching network gateway.

One skilled in the art will further recognize that the above-described network is a simplified network meant for explanatory purposes. It is likely that a telephone network may comprise numerous user stations, SSPs, STPs, SCPs, and SCNs along with other telephone network elements.

Thus, each telephone station (e.g., subscriber's telephone station 110 and called party's telephone station 112) is connected via a telephone line 111 (e.g., POTS, or similar) to a telephone system including SSPs 114, 116, and at least one SCP 118. SCP 118 contains control logic and feature data, and is a centralized node in the system. An SPA (not shown) may process calls and is a process running on SCP 118. Each SSP 114, 116 may be connected to a plurality of subscriber handsets 110, 112. Additionally, SCP 118 may provide routing instructions to a plurality of SSPs. Connections 150, 152 between SSPs 114, 116, and SCP 118, preferably are TCP/IP high-speed network connections (e.g., fiber optic, ethernet, etc.).

Parental Control Feature

With developments and improvements in telecommunications networks, subscribers are able to instruct serving telecommunications networks or exchanges to provide user-specific subscriber features. A Parental Control (PC) subscriber feature in accordance with the present invention can be implemented as one of these subscriber features. By signing up for and activating the PC subscriber feature, the associated subscriber is able to block or deny outgoing call connections. A subscriber to the PC feature is prompted audibly or alternately by Dual-Tone Multi-Frequency (DTMF) data entry for authorization information (such as an authorization code) and desired option information (such as information concerning what out-going calls should be blocked).

"Subscriber" in the context of this document is used to mean a subscriber to a telephone service. "Subscriber" as used here generally refers to an authorized party making out-going calls. "Caller" generally refers to any party, authorized or unauthorized, who places an out-going call from the subscriber's telephone station. "Called party" is used to designate a party called from the subscriber's telephone station. "Called line" refers to the telephone line to which a call is placed.

As used in the present specification, the term "authorization code" may be a "PIN" or "personal identification number" and means an alphanumeric that may be assigned to one or more callers. Thus, an authorization code may or may not be a unique personal identification code in that a household consisting of more than one authorized callers may have a single authorization code, but in any case, a particular authorization code is associated with a single telephone line.

Figure 2:
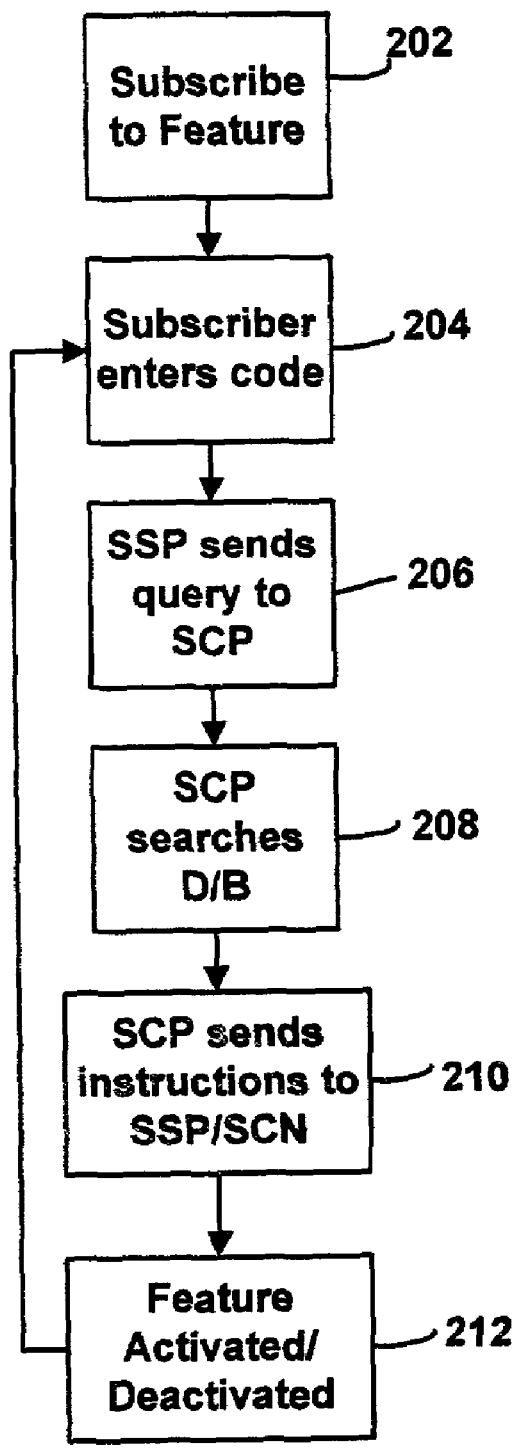
FIG. 2 shows a flow diagram of an exemplary method of activation of the system of FIG. 1 in accordance with the present invention.

Referring now to FIG. 2, there is illustrated a portion of an exemplary overview of the call flow logic 200 according to an aspect of the present invention. The call flow for the parental control feature begins when at step 202, a caller at telephone station 110 having for example, telephone directory number "(215) 555-1000" places a request to the caller's telephone company to sign up for a parental control feature as described above. The authorized caller is provided with a default authorization code, such as but not limited to, the area code and telephone directory number, for example, "(215) 555-1000" of the telephone calling number associated with telephone station 110. After the authorized caller signs up for the feature, database storage object 124 is updated or provisioned with information concerning the caller. For example, a parental control feature database at data storage object 124 may be updated with the information "(215) 555-1000", (the telephone directory number of telephone station 110), "(215) 555-1000", (the default authorization code), an activation indicator (initially set to indicate "no", the feature is not activated) and initial setup indicator, (initially set to indicate "yes", option information needs to be entered for the feature).

At step 204, a caller may enter a feature code, (such as but not limited to "*22"), using the keypad on telephone station 110. The call is transmitted to its associated SSP 114 in a conventional manner.

At step 206, SSP 114 sends a message to SCP 118, requesting instructions concerning call completion. The message preferably contains the telephone directory number (calling line number) of telephone station 110, ("(215) 555-1000") and a feature code identifier. SCP 118 determines if the subscriber associated with calling line number "(215) 555-1000" has signed up for the PC subscriber feature by querying database storage object 124 to see if calling line number "(215) 555-1000" is contained in the PC feature database of database storage object 124 (step 208).

If calling line number "(215) 555-1000" is not found in the PC feature database of database storage object 124, a (preferably) audible message is returned to the caller, such as but not limited to: "I'm sorry. The parental control feature can not be activated at this time. Please contact your telephone company for further information." Activation may not be possible either because the caller has not subscribed to the feature or because provisioning is not yet completed or the like.

If the calling line number is found in the feature database of database storage object 124, SCP 118 checks to see if the feature is already activated. If the feature is not already activated, SCP 118 checks to see if the "initial setup" indicator indicates that option information has not yet been received from an authorized caller. If the initial setup indicator indicates that no information has been acquired concerning what out-going calls should be blocked, SCP 118 instructs SCN 134 at step 210 to prompt the authorized caller for the following information: default authorization code, caller-selected authorization code, and caller-selected options and associated telephone directory numbers. After the information has been acquired, the "initial setup" indicator is set to indicate "yes, initial setup information has been received" and feature database at database storage object 124 is updated with the subscriber-selected authorization code.

If option information has been received, SCP 134 activates the feature at step 212 and outputs an audible message such as but not limited to: "The parental control feature has been activated. Please hang up".

If the feature is already activated, SCP 118 instructs SCN 134 to ask the caller to enter his/her authorization code. SCN 134 plays an audible message such as, but not limited to: "The parental control feature is active. To de-activate the feature, please enter your authorization code. If you do not wish to de-activate this feature, please hang up." The caller can enter the caller's authorization code audibly or (preferably) by pushing the keys on the number pad of the caller's telephone station 110. If the caller terminates the call without entering a code, the feature remains activated.

If the caller enters an authorization code, SCN 134 sends a message to SCP 118, preferably including the calling number and the authorization code entered by the caller. SCP 118 compares the authorization code received from the caller with the authorization code number stored for the calling line number in feature database of database storage object 124. If the authorization numbers are the same, SCP 118 instructs SCN 134 to ask the caller if the caller wishes to change option information or PIN information. If the caller does not want to change option information or PIN information, the feature is deactivated and an audible message such as but not limited to: "Parental Control has been deactivated" is delivered to the caller.

If the authorization code entered by the caller is not the same as the authorization code stored in database storage object 124 for the caller, preferably the caller is re-prompted for the authorization code with a message such as but not limited to: "I'm sorry. The authorization code you entered is not correct. Please enter your authorization code." If the caller does not successfully enter the authorization code, a message such as but not limited to: "I'm sorry. Deactivation of the parental control feature is not possible. Please hang up."

User-selected Authorization Code

When the caller enters the parental control feature code (e.g. "*22"), and the initial setup indicator indicates that option data has not yet been obtained, the caller is prompted to enter a user-selected authorization code. SCN 134 may deliver an audible message such as but not limited to: "Please enter an authorization code of your choice." After the caller enters his choice, SCN 134 may ask the caller to reenter the authorization code. If the caller enters the same code, the feature database of database storage object 124 is updated. If the caller does not enter the same code, SCN 134 re-prompts the caller for an authorization code. Preferably, the caller's authorization code does not correspond with the default authorization code.

According to another aspect of the invention, when the PC feature is activated and the caller enters the feature code (e.g. "*22"), SCN 134 will respond with a message such as but not limited to: "The parental control feature is active. Do you want to. deactivate it? If yes, press or say 1. If no, press or say 2." If the caller responds indicating "yes", SCN 134 prompts the caller to enter the caller's authorization code, by delivering an audible message such as but not limited to: "Please enter your authorization code." SCN 134 receives the authorization code from the caller and sends a message to SCP 118 including calling line number and authorization code. SCP 118 compares the authorization code received from SCN 134 with the authorization code associated with the calling line number in the feature database of database storage object 124. If the codes are not the same and the caller is unable to enter the correct authorization code, SCN 134 delivers an audible message such as: "I'm sorry. I am unable to deactivate the parental control feature at this time. Please hang up." SCN 134 then terminates the call.

Options

If the caller enters the correct authorization code, that is, the code SCN 134 sends to SCP 118 is the same as the code contained in feature database of database storage object 124, SCN 134 may ask the caller to select from the available options, which may include but are not limited to the following:

Prohibit all outgoing calls.
Prohibit outgoing long distance telephone calls.
Prohibit outgoing calls to specified area codes.
Prohibit outgoing calls to specified telephone numbers.
Prohibit * (star) feature calls.
Allow out-going calls only to specified telephone numbers.
Allow out-going calls only to local telephone numbers.

Question 1

SCN 134 may deliver an audible message asking the caller if the caller wants all out-going calls, except emergency (e.g. "911") calls, to be blocked. SCN 134 may deliver an audible message such as but not limited to: "Do you want to block all outgoing calls except for emergency calls? Press or say 1 for 'yes'. Press or say 2 for 'no'."

If the caller responds with an answer indicating "yes", all out-going calls will be blocked, except for emergency calls and processing may continue with Question 5. If the caller responds with an answer indicating "no", processing may continue at Question 2

SCN 134 may deliver an audible message asking the caller if the caller wants all out-going calls to long distance numbers to be blocked. SCN 134 may deliver an audible message such as but not limited to: "Do you want to block all calls to long-distance telephone directory numbers? Press or say 1 for 'yes'. Press or say 2 for 'no'."

If the caller responds with an answer indicating "yes", all calls to long-distance telephone directory numbers will be blocked and processing may continue with Question 5. If the caller responds with an answer indicating "no", processing may continue with Question 3.

Question 3

SCN 134 may ask the caller if the caller wants calls to certain area codes blocked. SCN 134 may deliver an audible message such as but not limited to, "Do you want to block all calls to a specified area code? Press or say 1 for "yes". Press or say 2 for 'no'." If the caller responds with an answer indicating "no", processing may continue with Question 4. If the caller responds with an answer indicating "yes", SCN 134 may ask the caller for an area code for which out-going calls should be blocked with an audible message such as but not limited to: "Please enter the three digit area code for which outgoing calls should be blocked." After the caller enters a three-digit area code, SCP 118 may validate the code and if the code is a valid area code, the caller may be prompted for another area code. If the code is not valid, the caller may be re-prompted for the area code with an audible message such as but not limited to: "I'm sorry. ### is not a valid area code. Please re-enter the area code." After the caller has entered all area codes for which out-going telephone calls should be blocked, processing may continue with Question 4.

Question 4.

SCN 134 may ask the caller if the caller wants calls to certain telephone numbers blocked. SCN 134 may deliver an audible message such as but not limited to, "Do you want to block all calls to a specified telephone directory number? Press or say 1 for "yes". Press or say 2 for "no"." If the caller responds with an answer indicating "no", processing may continue with Question 5. If the caller responds with an answer indicating "yes", SCN 134 may ask the caller for a telephone number for which out-going calls should be blocked with an audible message such as but not limited to: "Please enter the ten digit telephone number for which outgoing calls should be blocked." After the caller enters a three-digit area code, SCP 118 may validate the telephone number and if the telephone number is valid, the caller may be prompted for another telephone number. If the telephone number is not valid, the caller may be re-prompted for the telephone number code with an audible message such as but not limited to: "I'm sorry. ### is not a valid telephone number. Please re-enter the telephone number."After the caller has entered all telephone numbers for which out-going telephone calls should be blocked, processing may continue with Question 5.

Question 5.

SCN 134 may deliver an audible message asking the caller if the caller wants all feature code calls, except parental control feature calls, to be blocked. SCN 134 may deliver an audible message such as but not limited to: "Do you want to block all special feature calls, such as conference calls, except for parental control feature calls? Press or say 1 for 'yes'. Press or say 2 for 'no'."

If the caller responds with an answer indicating "yes", all special feature out-going calls will be blocked, except for parental control feature calls and processing may continue with Question 6. If the caller responds with an answer indicating "no", processing may continue at Question 6.

Question 6.

SCN 134 may deliver an audible message asking the caller if the caller wants to allow all local calls. SCN 134 may deliver an audible message such as but not limited to: "Do you want to allow all local calls? Press or say 1 for 'yes'. Press or say 2 for 'no'."

If the caller responds with an answer indicating "yes", all local calls will be allowed. If the caller responds with an answer indicating "no", processing may continue at Question 7.

Question 7.

SCN 134 may deliver an audible message asking the caller if the caller wants to allow local calls only to specified local telephone numbers. SCN 134 may deliver an audible message such as but not limited to: "Do you want to allow only local calls to specified local telephone numbers? Press or say 1 for 'yes'. Press or say 2 for 'no'."

If the caller responds with an answer indicating "no", processing is complete. If the caller responds with an answer indicating "yes", SCN 134 may ask the caller for a local telephone number for which an out-going call should be allowed with an audible message such as but not limited to: "Please enter the seven digit local telephone number for which outgoing calls should be allowed." After the caller enters a seven-digit local telephone number, SCP 118 may validate the telephone number and if the telephone number is valid, the caller may be prompted for another telephone number. If the telephone number is not valid, the caller may be re-prompted for the telephone number code with an audible message such as but not limited to: "I'm sorry. ### is not a valid telephone number. Please re-enter the telephone number." After the caller has entered all telephone numbers for which out-going telephone calls should be allowed, processing is complete.

All the options, codes and numbers selected and entered are stored in feature database of database storage object 124.

Calls Allowed/Prohibited Processing

Figure 3:
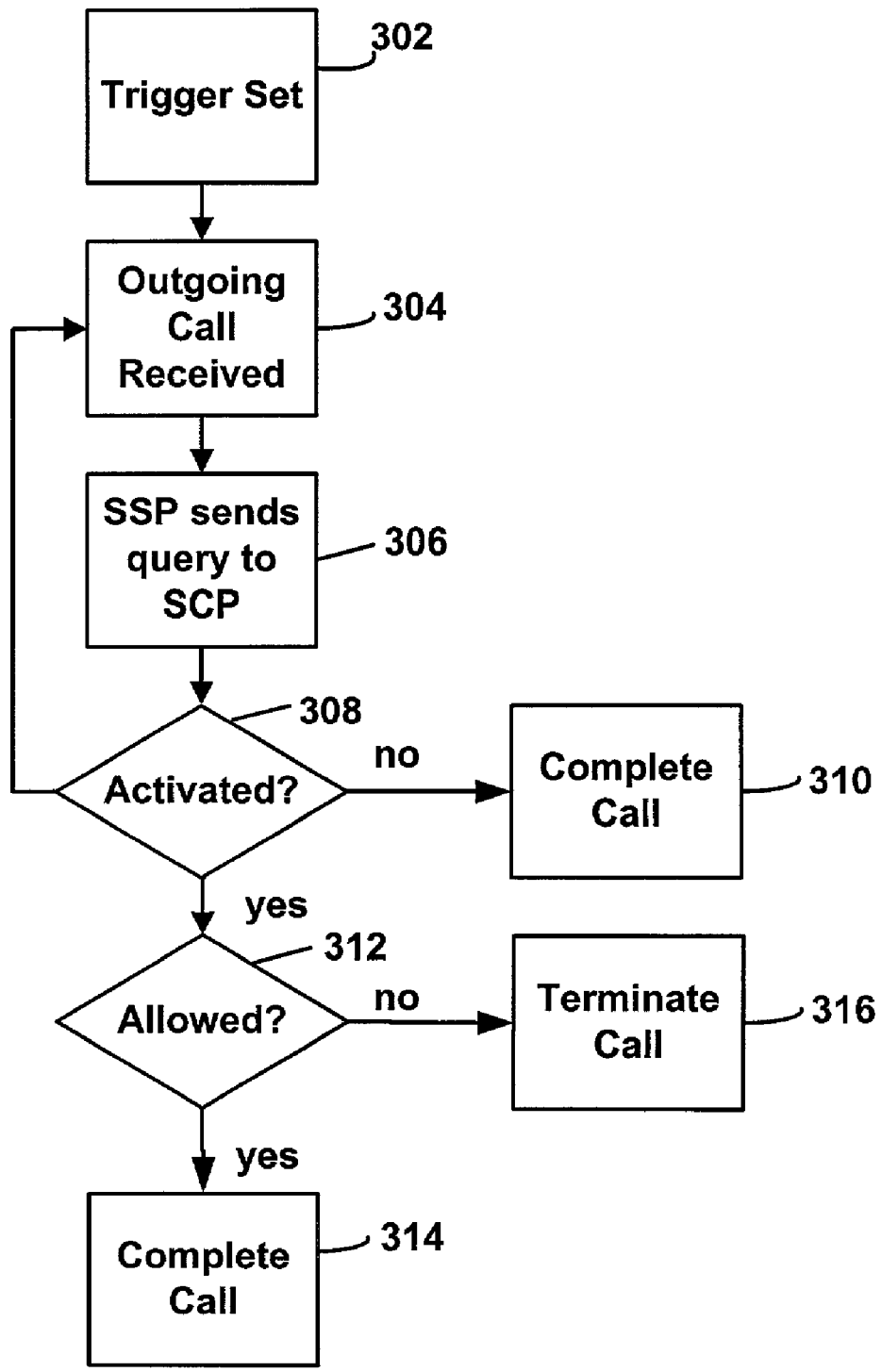
FIG. 3 shows a flow diagram of an exemplary method of operation of the system of FIG. 1 in accordance with the present invention.

FIG. 3 illustrates a portion of an exemplary call flow in accordance to the present invention. Referring now to FIG. 3, at step 302 a feature code trigger is placed on the telephone line associated with telephone station 110 when the subscriber associated with telephone station 110 signs up for the PC feature. At step 304 an outgoing call is received at SSP 114 from telephone station 110. At step 306, a feature code trigger at SSP 114 halts processing and sends a message including the calling line number and the called number to SCP 118. At step 308 SCP 118 checks to see if the feature is activated. At step 310, if the feature is not activated, the call is completed. At step 312, if the feature is activated, SCP 118 checks to see if the called number is listed in feature database of database of storage object 124 as an allowed telephone directory number or category of telephone directory numbers or if it is a prohibited number or category. If the telephone directory number is an allowed number or belongs to a category of allowed numbers, the call is completed at step 316.

If the telephone directory number is a prohibited number or belongs to a category of prohibited numbers, the call is not completed (step 316). SCP 118 preferably instructs SCN 134 to communicate an audible message to the caller, such as, "I'm sorry, your call cannot be completed."

According to another aspect of the invention, one feature code (such as but not limited to *22) is entered to activate the feature and another feature code (such as but not limited to *23) is entered to deactivate the feature.

The PC subscriber feature of the present invention can be activated/deactivated manually by the subscriber. According to this aspect of the invention, the caller dials a feature code (e.g., *22) on his home phone. Deactivation is accomplished by dialing the feature code again, similar to a toggle switch. When deactivating the feature, the caller is prompted to enter the authorization code from the caller's telephone station.

Alternately, the caller is prompted for authorization code both when the feature is activated and when it is deactivated.

Alternately, the service can be activated and deactivated automatically, according to pre-set conditions, such as at the times specified on a time of day list (e.g. activate at 8 am and deactivate at 7 pm). Moreover, the time of day list can include particular days (e.g. Mondays, weekdays, weekends, or the like) in addition to times of day that the PC feature is to be activated or deactivated. These time periods can be stored in feature database of database storage object 124 or other storage locations. In this manner, the subscriber does not have to manually turn on and off the PC feature at the times the subscriber would like the service to be activated/deactivated.

Preferably the subscriber designates the activation/deactivation time periods and other commands through oral commands although DTMF input using the keys on the keypad of a telephone is also contemplated by the invention. These day and time periods or range of days and range of time periods (start and end interval) in which the PC subscriber feature will be in effect are selectable by the subscriber preferably when the subscriber dials the feature code and enters the authorization code, such as when deactivating the feature.

According to another aspect of the invention, the feature can be over-ridden (for the current out-going call only) by entering an over-ride code.

The invention may be embodied in the form of appropriate computer software, or in the form of appropriate hardware or a combination of appropriate hardware and software without departing from the spirit and scope of the present invention. Further details regarding such hardware and/or software should be apparent to the relevant general public. Accordingly, further descriptions of such hardware should be apparent to the relevant general public. Accordingly, further descriptions of such hardware and/or software herein are not believed to be necessary.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects. Additionally, certain features and functions attributed to a particular network element may be performed by another network element without departing from the scope and spirit of the invention. As an example, if a function such as a database query is attributed to a network element such as an SSP, such query may be performed alternatively or additionally by an STP or SCP or by any other network element without departing from the spirit and scope of the invention.

What is claimed is:

1. A method for blocking at least one outgoing communication: from a calling party to a calling line selected by the calling party in connection with a parental control feature offered to subscribers as an outgoing call blocking service, said calling party having a calling line identification number, said method comprising:

enabling the subscriber to select special feature codes and request that outgoing communications that relate to the special feature codes, and that originate from the calling line identification number, be blocked, wherein special feature codes are received by an automated system that recognizes oral commands and alphanumeric input;

receiving an outgoing communication related to at least one of the special feature codes, said calling line associated with at least one subscriber to the outgoing call blocking service;

obtaining a calling line identification number for said received outgoing communication;

obtaining a called line identification number for said received outgoing communication;

activating the outgoing call blocking service at a first pre-set time;

de-activating the outgoing call blocking service at a second pre-set time;

looking for said calling line identification number associated with the received outgoing communication in a data store to determine data associated with said calling line identification number concerning calls from the calling line to a called line which are to be blocked;

terminating the received outgoing communication if the data indicates that the received outgoing communication is to be blocked; and overriding the outgoing call blocking service for at least a second single outgoing communication from the calling line in response to receiving an override code.

2. The method of claim 1, wherein the special feature code is a star-feature code.

3. The method of claim 1, wherein the special feature code relates to conference call capabilities.

4. The method of claim 1, wherein said data concerning calls to be blocked comprises a list of area codes to which calls are to be blocked.

5. The method of claim 1, wherein said data concerning calls to be blocked comprises a list of at least one of a plurality of called line identification numbers of calls which are to be blocked.

6. The method of claim 1, wherein said data concerning calls to be blocked comprises all calls.

7. The method of claim 1, wherein said data concerning calls to be blocked comprises all long distance calls.

8. The method of claim 1, wherein said data concerning calls to be blocked comprises all calls except calls to one of a plurality of specified area codes.

9. The method of claim 1, wherein said data concerning calls to be blocked comprises all calls except local calls.

10. A method of activating an outgoing call blocking service provided as a parental control feature, the method comprising:

receiving, from a calling line at a central office associated with the calling line, a predetermined access code to the outgoing call blocking service;

prompting a subscriber to the outgoing call blocking service to provide data concerning outgoing calls to be blocked, wherein the subscriber is prompted to use oral commands to provide data;

receiving the orally-provided data and converting the orally-provided data to alphanumeric data;

storing said alphanumeric data in a data store associated with the outgoing call blocking service;

activating the outgoing call blocking service at one of a pre-set time and a pre-set day;

enabling the subscriber to prohibit outgoing long-distance calls from being placed from the calling line;

enabling the subscriber to prohibit outgoing calls to at least one specified area code;

enabling the subscriber to prohibit outgoing calls to at least one specified telephone number;

enabling the subscriber to prohibit calls that relate to special feature codes from being placed from the calling line, wherein at least one of the special features is a star feature code that relates to conference calling capabilities;

enabling the subscriber to allow outgoing calls only to at least one specified local telephone number; and enabling the subscriber to allow outgoing calls only to at least one specified telephone number.

11. The method of claim 10, further comprising:
prompting the caller for an authorization code; and
comparing the received authorization code with a stored authorization code for the calling line identification number.

12. The method of claim 11, further comprising activating the service if the received authorization code corresponds to the stored authorization code for the calling line identification number.

13. The method of claim 11, further comprising not activating the service if the received authorization code does not correspond to the stored authorization code for the calling line identification number.

* * * * *